United States Patent
Kunde et al.

(10) Patent No.: US 6,364,306 B1
(45) Date of Patent: Apr. 2, 2002

(54) CONFIGURATION FOR DETERMINING THE DIMENSIONS OF PRINTED MEDIA

(75) Inventors: Christoph Kunde, Berlin; Michael Schmidt-Kretschmer, Lehnitz, both of (DE)

(73) Assignee: Francotyp Postalia AG & Co., Birkenwerder (DE)

(*) Notice: Subject to any disclaimer, the term of this patent is extended or adjusted under 35 U.S.C. 154(b) by 0 days.

(21) Appl. No.: 09/524,233

(22) Filed: Mar. 13, 2000

(30) Foreign Application Priority Data

Mar. 13, 1999 (DE) .......................... 199 12 807

(51) Int. Cl.[7] .................................. G07F 11/00
(52) U.S. Cl. .................. 271/2; 271/10.01; 271/264; 271/272
(58) Field of Search .................. 271/2, 10.01, 264, 271/272; 209/900

(56) References Cited

U.S. PATENT DOCUMENTS

| 4,787,620 A | 11/1988 | Goldkuhle |
| 5,181,705 A | 1/1993 | Ueda et al. |
| 5,535,127 A | 7/1996 | Uno et al. |
| 5,954,324 A | * 9/1999 | Rehberg et al. |
| 6,241,235 B1 | 6/2001 | Schmidt-Kretschmer |

FOREIGN PATENT DOCUMENTS

| DE | 35 44 093 A1 | 6/1987 |
| DE | 196 05 017 A1 | 8/1997 |
| DE | 198 36 235 A1 | 2/2000 |
| EP | 0 906 792 A2 | 4/1999 |
| GB | 2 236 859 A | 4/1991 |

\* cited by examiner

*Primary Examiner*—David H. Bollinger
(74) *Attorney, Agent, or Firm*—Herbert L. Lerner; Laurence A. Greenberg; Werner H. Stemer

(57) ABSTRACT

A configuration for determining the dimensions of printed media, especially of letters or envelopes, is used in a separating apparatus of a mail processing system, in which the printed media are transferred on an output side by an ejector to a following device, such as a scale or a franking machine. The field of use is widened by determining the dimensions of the printed media by using existing elements. A device is provided for scanning and determining the dimensions of the printed media, and the ejector is included in the scanning of the printed media. Sensors are electrically connected to an evaluation circuit which transmits measurement results to the following device.

13 Claims, 7 Drawing Sheets

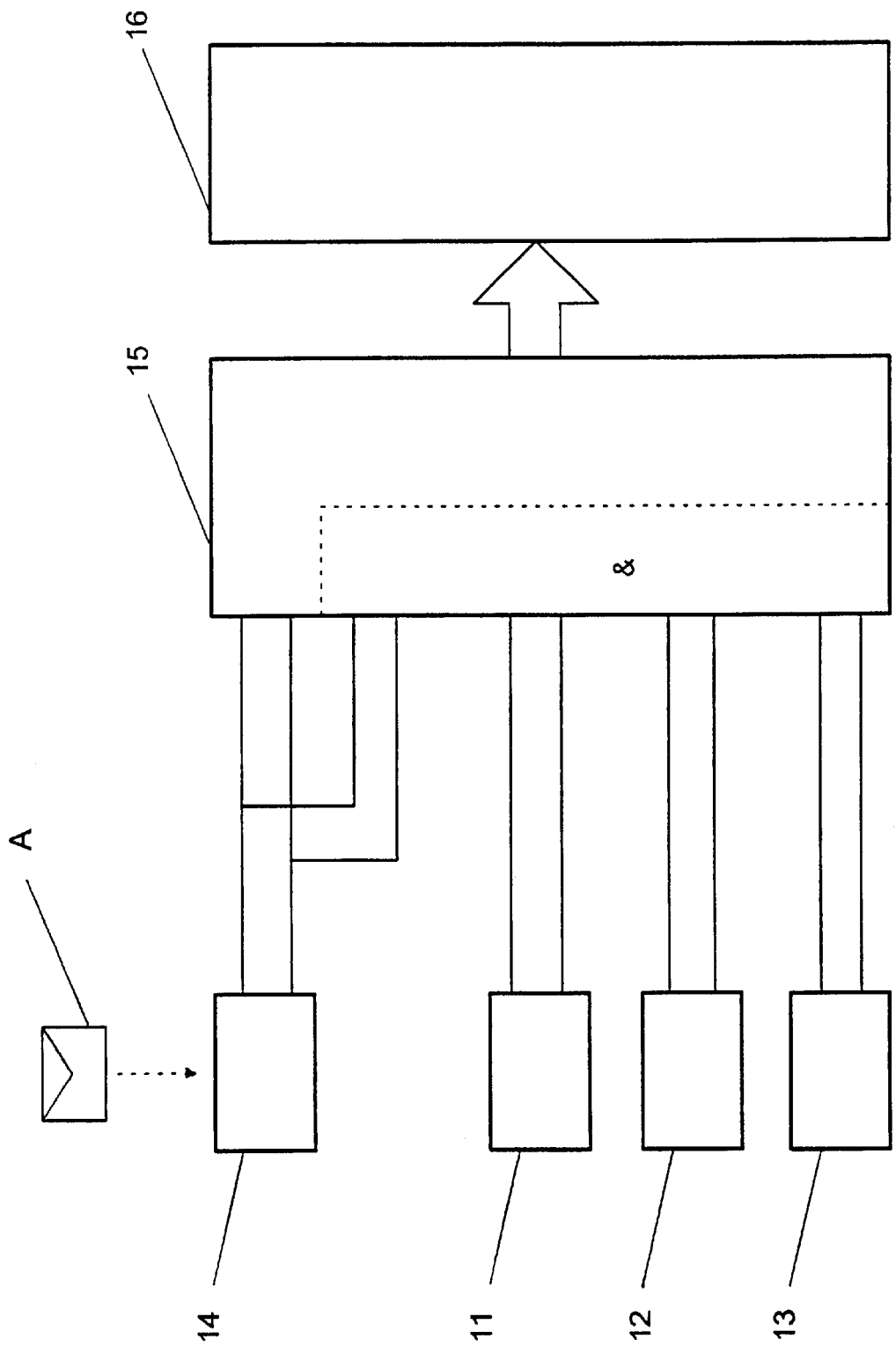

CONFIGURATION FOR DETERMINING THE DIMENSIONS OF PRINTED MEDIA

BACKGROUND OF THE INVENTION

Field of the Invention

The invention relates to a configuration for determining the dimensions of printed media, especially of letters or envelopes, in a letter or envelope separating apparatus. In that case, the letters or envelopes can have different thicknesses and permissible formats in an irregular sequence. The processing of letters or envelopes occurring in that way is referred to as mixed mail operation.

Mail processing systems normally include:
- a letter or envelope separating apparatus, in which the letters or envelopes are placed successively in stacks, separated and closed as required,
- a franking and/or addressing machine with an optional integrated or preceding balance or scale, and
- a depositing apparatus.

Reference is made in that regard to German Design Application DE-M 96 09 167.3 in the Registered Design Bulletin of the German Patent Office, dated May 24, 1997, Part Ia, Goods Class 18/02.

In order to determine the necessary postage, various postal carriers need information relating to the dimensions of the letter or envelope, in addition to the destination, the class of mail and the weight.

An apparatus for measuring the thickness of an item of mail is known from European Patent EP 0 376 496 B1. During operation, that apparatus is coupled to a separating apparatus. The separating apparatus essentially includes a stationary circulating transport belt and a movable retaining belt running in the opposite direction, which is deflected in accordance with the thickness of the item of mail. The thickness measuring apparatus has a part which produces a connection with the separating apparatus, in particular with the retaining belt, and can be moved with the latter, as well as a stationary part. The measured thickness is related to the extent of the relative movement between the movable and the stationary parts. The movable part has a magnet and the stationary part has a magnetic field detector.

In addition, an apparatus is known from European Patent EP 0 548 874 B1, for measuring the thickness of a letter sheet moving in a folding and inserting machine for documents before franking. That apparatus operates with a sensing device which supplies electrical signals. The sensing device includes a pair of rollers through which the letter sheet passes. One of the rollers is pivotably mounted on a sensing lever, which is permanently connected to a flag. The flag interacts with a light source and a light detector which responds to the light beams. The flag includes a sector with numerous slits and is disposed in such a way that, through the use of nontransparent areas between the slits, it covers light beams which are directed toward the detector. The detector is an optical encoder, which delivers pulses each time a slit in the flag passes in front of the encoder. The optical encoder is an incremental encoder having two output channels, which are located in phase quadrature and give a signal transition when the thickness varies by a few hundredths of a millimeter. However, only one dimension of the letter is determined with both of the above-described apparatus.

On the other hand, an apparatus for measuring the length, the width and the height of box-like conveyed products is known from German Published, Non-Prosecuted Patent Application DE 196 10 631 A1, in which, for that purpose, sensors are provided that have a transmitting and receiving part and a direction of measurement which is oriented perpendicularly to side surfaces of the conveyed product, which rests in a predetermined attitude on a holding element. The sensors being used are three distance sensors, having directions of measurement that are in each case perpendicular to one another. The holding element essentially includes a baseplate and stop elements for orienting the conveyed product on the baseplate. The distance between the directions of measurement of the sensors and the associated stop elements in each case is about 1 to 50 mm. The distance sensors are constructed as ultrasonic sensors and have circuits working on the echo-sounding principle. In that case, the distance between the direction of measurement and the stop element is preferably 20 mm.

Another variant provides for optical distance sensors. That apparatus can be used only for static and not for continuous operation, in accordance with the feeding conditions for the conveyed products. Furthermore, because of the minimum distance of the directions of measurement from the stop elements, that apparatus is suitable only for packages and not for thin letters or envelopes. Added to that is the fact that a different finish of the material for the envelopes can result in different ultrasonic reflection properties and, consequently, erroneous measurement results can occur.

Furthermore, a franking machine is known from German Utility Model DE 297 16 523 U1, which has a digital printing device, a guide plate and a transport apparatus with a transport belt for printed media, as well as a control device. The control device is used to generate printing signals for a printing head in order to print the surface of the printed medium with an appropriate printed image while the printed medium is transported past the printing head. A pressure sensor in the guide plate is disposed in front of a recess for the printing head. In addition, a preparation sensor is disposed upstream in the guide plate, at a specific distance in front of the pressure sensor. The preparation sensor is constructed as a reflected light barrier, and the pressure sensor is constructed as a transmitted light barrier.

The control device includes a microprocessor, to which an encoder for determining the travel of the transport belt and a number of sensors are connected, with the latter being located at intervals from one another upstream of the printing head. The microprocessor is programmed to determine a valid letter format or a fault on the basis of interrogating the preparation sensor and the pressure sensor and determining the travel of the belt. The microprocessor determines the length of a letter or envelope from the difference between the value for the leading edge of the letter and the value for the trailing edge of the letter. A fault message is output if the length of the letter is greater than the predetermined travel of the belt, or if the length of the letter is less than the predetermined imprint length. Since the length of the letter has to be taken into account in calculating the postage and, consequently, in creating the imprint, an appropriate expenditure on the microprocessor is necessary if the letter transport speed is not to be restricted significantly. With that configuration, likewise only one dimension of the letter is determined.

Furthermore, a configuration for pre-separating printed media is known from German Published, Non-Prosecuted Patent Application DE 196 05 017 A1, in which the letters or envelopes, standing on one edge, are deposited one after another as a letter stack, and the letters are fed laterally away from the letter stack to a separating apparatus. In that case, the letters or envelopes are disposed between a spring-mounted pressure clip and at least one drive roll and a guide plate which is inclined slightly rearward. The standing surface for the letters and the guide plate are orthogonal to each other.

Finally, a further apparatus for separating printed media, especially letters or envelopes, has been found, corresponding to German Published, Non-Prosecuted Patent Application DE 198 36 235 A1, corresponding to U.S. application Ser. No. 09/368,645, filed Aug. 5, 1999. That apparatus will be explained in more detail below with regard to FIG. 1.

The purpose of the invention is to improve the function and to widen the field of use.

SUMMARY OF THE INVENTION

It is accordingly an object of the invention to provide a configuration for determining the dimensions of printed media, which overcomes the hereinafore-mentioned disadvantages of the heretofore-known devices of this general type, in which elements of a separating apparatus can largely be utilized at the same time and in which the technical outlay and space requirement is as low as possible.

With the foregoing and other objects in view there is provided, in accordance with the invention, in a separating apparatus for printed media, especially letters or envelopes, including a guide plate on which the printed media rest in stacked form and along which the printed media are transported laterally, and a following device downstream of the guide plate, a configuration for determining dimensions of the printed media, comprising a device for scanning the printed media and determining dimensions of the printed media; and an ejector for transferring the printed media from the guide plate to the following device, the ejector included in the scanning of at least one dimension of the printed medium.

In accordance with another feature of the invention, the ejector is a pair of ejection rolls including a stationary driven ejection roll and a spring-adjustable indirectly driven ejection roll; at least one first optical sensor for determining height of the printed media is disposed in the guide plate, upstream of the pair of ejection rolls, at a distance smaller than a shortest printed medium length to be expected; an encoder sensor is connected synchronously to the indirectly driven ejection roll and has a number of revolutions per printed medium used for printed-medium length measurement; a second optical sensor is connected to the indirectly driven ejection roll for using a deflection of the ejection roll by the printed medium guided between the pair of ejection rolls for printed-medium thickness measurement; a third optical sensor is disposed directly in the vicinity of the pair of ejection rolls, is used to detect a start and an end of a printed medium in the ejection area and is linked electrically to the first optical, second optical and encoder sensors for activating the first optical, second optical and encoder sensors at the start of the printed medium and deactivating the first optical, second optical and encoder sensors at the end of the printed medium, to detect the dimensions of the printed medium; and an evaluation circuit is disposed in the separating apparatus, is electrically connected to the first optical, second optical, third optical and encoder sensors for transmitting measurement results and is electrically connected to the following device, such as a scale or a franking machine.

In accordance with a further feature of the invention, the at least one first optical sensor is many sensors disposed in a chain one above another, corresponding to usual formats, for determining the height of the printed media.

In accordance with an added feature of the invention, the at least one first optical sensor is a reflection sensor.

In accordance with an additional feature of the invention, there is provided a rotatable shaft and a carrying lever for the indirectly driven ejection roll; the encoder sensor for printed-medium length measurement having an encoder disk and an evaluation unit with a photocell; the encoder disk and the indirectly driven ejection roll jointly fixed on the rotatable shaft; and the evaluation unit fixed underneath the encoder disk on the carrying lever.

In accordance with yet another feature of the invention, there is provided a carrying lever having a shaft, the second optical sensor for printed-medium thickness measurement having an analog reflection sensor and a reflection marker fixed to the carrying lever opposite the stationary reflection sensor, in the vicinity of the shaft of the carrying lever.

In accordance with yet a further feature of the invention, there is provided a carrying lever having a shaft, the second optical sensor for printed-medium thickness measurement having a digital transmitted-light sensor and a flexible, graduated, transparent rule guided in the second optical sensor and fixed to the carrying lever in the vicinity of the shaft.

In accordance with a concomitant feature of the invention, the ejection rolls define a line of contact therebetween, and the third optical sensor for detecting printed media is disposed immediately upstream or downstream of the line of contact.

For the first time, during the transport of the letter or envelope in a separating apparatus, before weighing and at a sufficiently long time before the franking, all of the dimensions of the letter or envelope are determined, so that there is sufficient time to accommodate the postage value in the franking imprint without having to place particularly high requirements on the computing technology needed therefor. Through multifunctional use of the indirectly driven ejection roll, including its accessories, a measurement of thickness and length is achieved without demanding any additional space and with a low outlay. At the same time, astonishingly accurate results are achieved.

Other features which are considered as characteristic for the invention are set forth in the appended claims.

Although the invention is illustrated and described herein as embodied in a configuration for determining the dimensions of printed media, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a block diagram relating to registering the dimensions and further processing.

DESCRIPTION OF THE PREFERRED EMBODIMENTS

For the purpose of simplification and for ease of understanding, the drawings have been made in diagrammatic form. For brevity, the term "letter" will be used below instead of the terms "envelope" or "printed medium".

Figure 1:
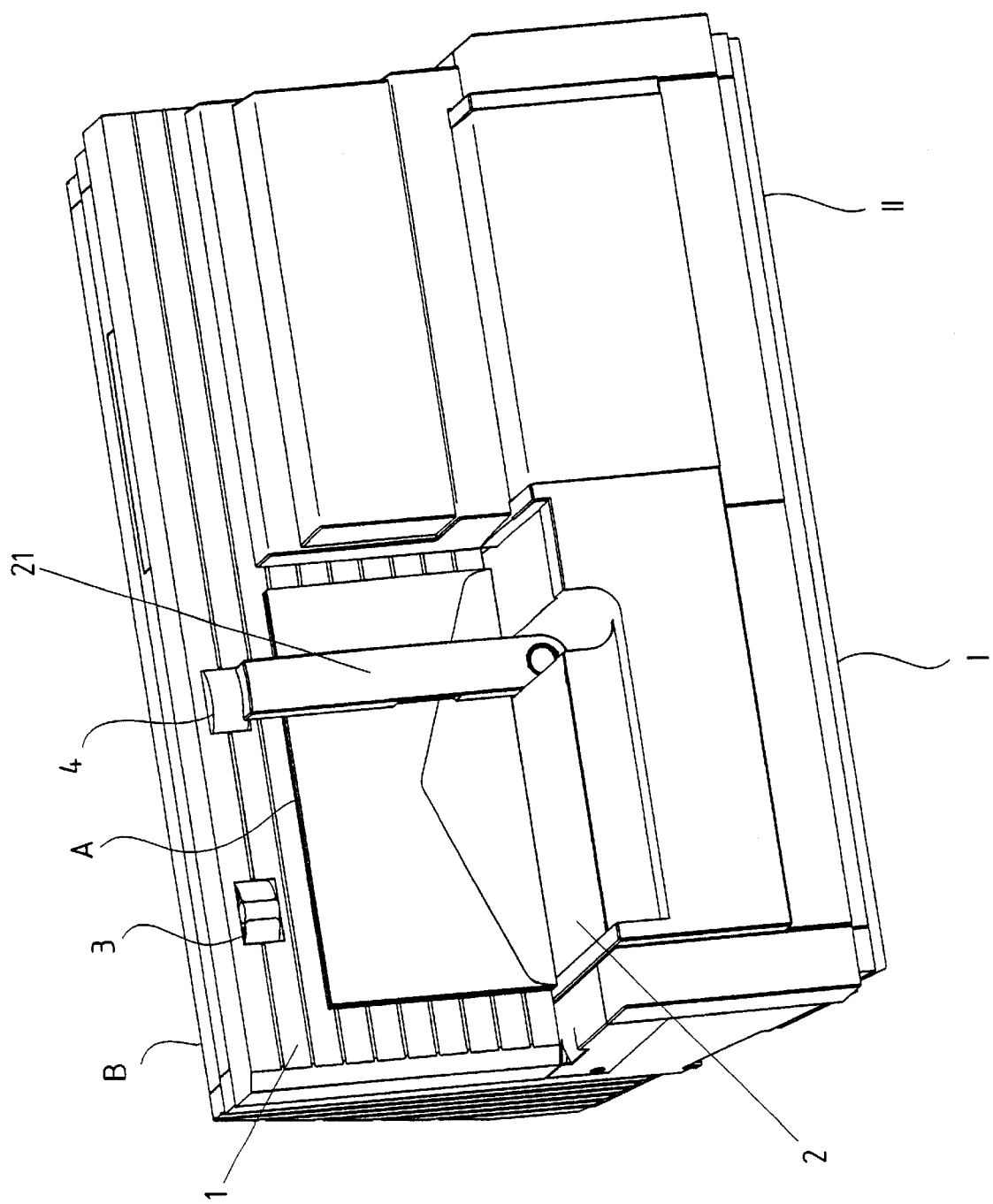
FIG. 1 is a diagrammatic, front left perspective view of a letter separating apparatus according to German Published, Non-Prosecuted Patent Application DE 198 36 235 A1, corresponding to U.S. application Ser. No. 09/368,645, filed Aug. 5, 1999.

Referring now to the figures of the drawings in detail and first, particularly, to FIG. 1 thereof, which illustrates an apparatus according to German Published, Non-Prosecuted Patent Application DE 198 36 235 A1, corresponding to U.S. application Ser. No. 09/368,645, filed Aug. 5, 1999, it is seen that letters A are stacked one behind another in a separating apparatus B. The letters A stand with one edge on a lower guide plate 2 and are disposed between a spring-mounted pressure clip 21, drive roll combinations 3, 4 and a guide plate 1 which is inclined slightly rearward. The drive rolls have cylindrical enveloping surfaces which project through openings in the guide plate 1, and the letters A are individually transported away laterally by the drive rolls.

Figure 2:
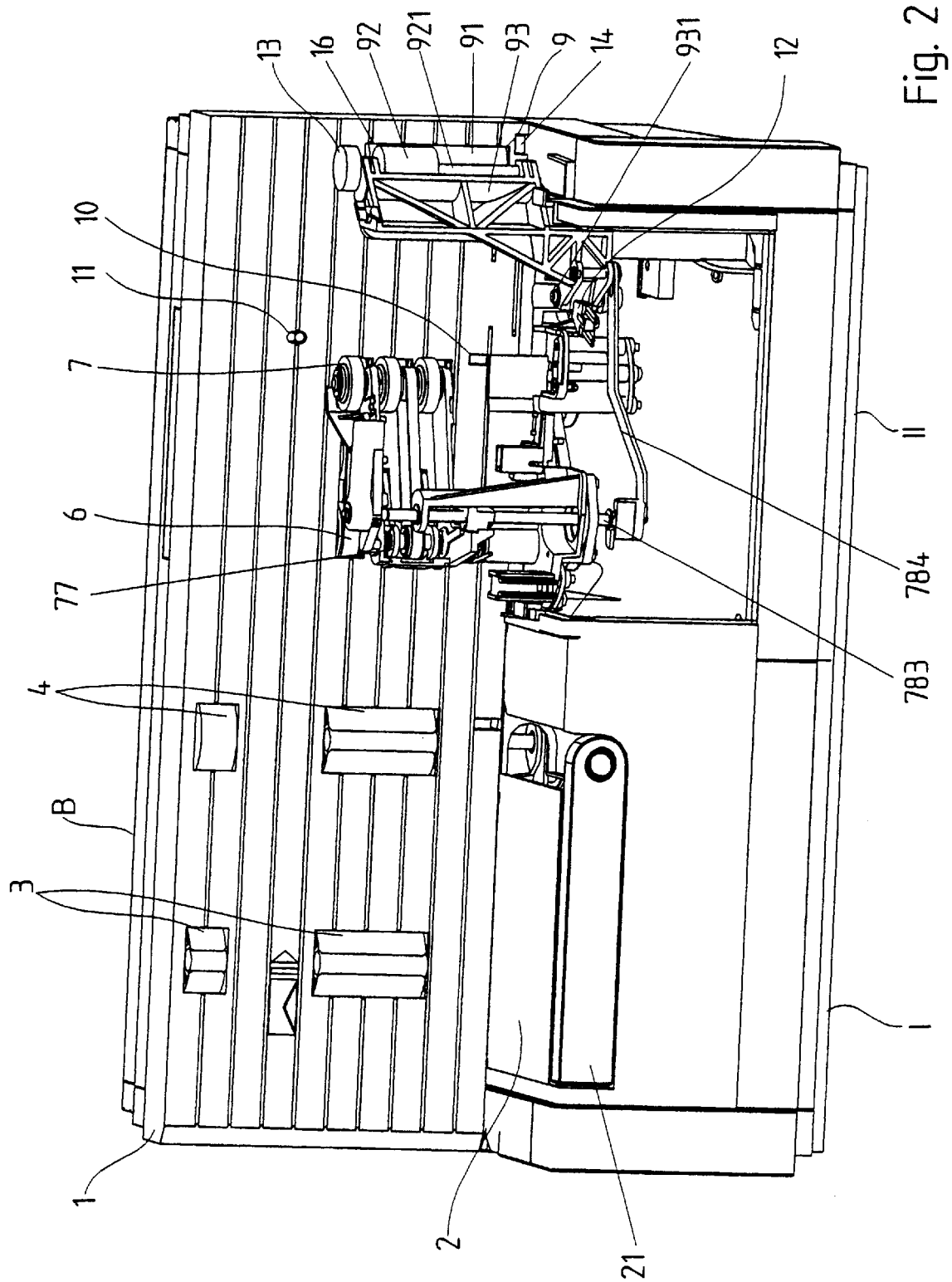
FIG. 2 is a partly cut or broken-away, front right perspective view similar to FIG. 1 with additions according to the invention.

As is seen in FIG. 2, a pre-separating area I with two drive roll combinations 3, 4, and a separating area II with elements 6, 7, 77 for separating are provided. In addition, a sensor 10 for detecting printed media and an ejection device or ejector 9 in the form of an ejection roll pair 91, 92 are also present in the separating area II.

The separating elements 6, 7, 77 include a drive belt combination 6, a driven mating roller combination 7 matched to the latter, and a likewise matched, preceding sliding lever combination 77. The sensor 10 is disposed in the area of the mating roller combination 7 and is linked electrically to a drive 5 shown in FIG. 3 for the two drive roll combinations 3, 4. In this way, the drive 5 is switched to freewheeling when a start of a printed medium is detected and is switched on when an end of a printed medium is detected.

The ejection roll pair 91, 92 includes a driven ejection roll 91 and an indirectly driven ejection roll 92. The driven ejection roll 91 is fixed on a rotatable shaft 911 behind the guide plate 1 and projects partly through a matched opening 16 in the same. The indirectly driven ejection roll 92 is fixed on a likewise rotatable shaft 921 in front of the guide plate 1, as is seen in particular in FIGS. 2 and 3.

The shaft 921 is mounted in such a way that it can rotate on one end of a rotatably spring-mounted carrying lever 93. Another end of the carrying lever 93 is articulated through a coupling rod 784 to a locking device 78, in order to achieve simultaneous deactivation and locking of the indirectly driven ejection roll 92 and the mating roller combination 7. The locking device 78 can be operated by hand through the use of a lever 782, which is fixed to a rotatable shaft 783. The locking device 78 serves to pivot and lock a double carrying lever 76 for the mating roller combination 6 when it is pivoted away.

A common drive 8 with a motor 84 is provided for the drive belt combination 6, the mating roller combination 7 together with the sliding lever combination 77 and the ejection roll pair 91, 92.

According to FIG. 2, at least one first optical sensor 11 constructed as a reflection sensor is disposed in an appropriately adapted opening in the rear guide plate 1. This sensor 11 is used to establish whether the letter exceeds a specific format height, for example the frequently used size C6, or lies within that postal standard. As a rule, this determination of the threshold value is sufficient. If, however, more accurate information is needed, then instead of the individual sensor 11 a corresponding sensor chain of sensors disposed one above another is used. The sensor 11 has a smaller spacing from the pair of ejection rolls 91, 92 than the shortest letter length to be expected.

When the start or leading edge of a letter is detected by the sensor 10, which is likewise constructed as a reflection sensor, at the start of the separating area I, the sensor generates a signal which is used to change over the drive roll combinations 3, 4 in the separating area II from drive to idle. At the end or trailing edge of the letter, the sensor 10 correspondingly generates a signal to change over from idle to drive. In this way, the next letter A is shifted out of the feed or pre-separating area I into the separating area II only when the current letter A has left the same. The formation of a build-up is therefore ruled out.

Figure 3:
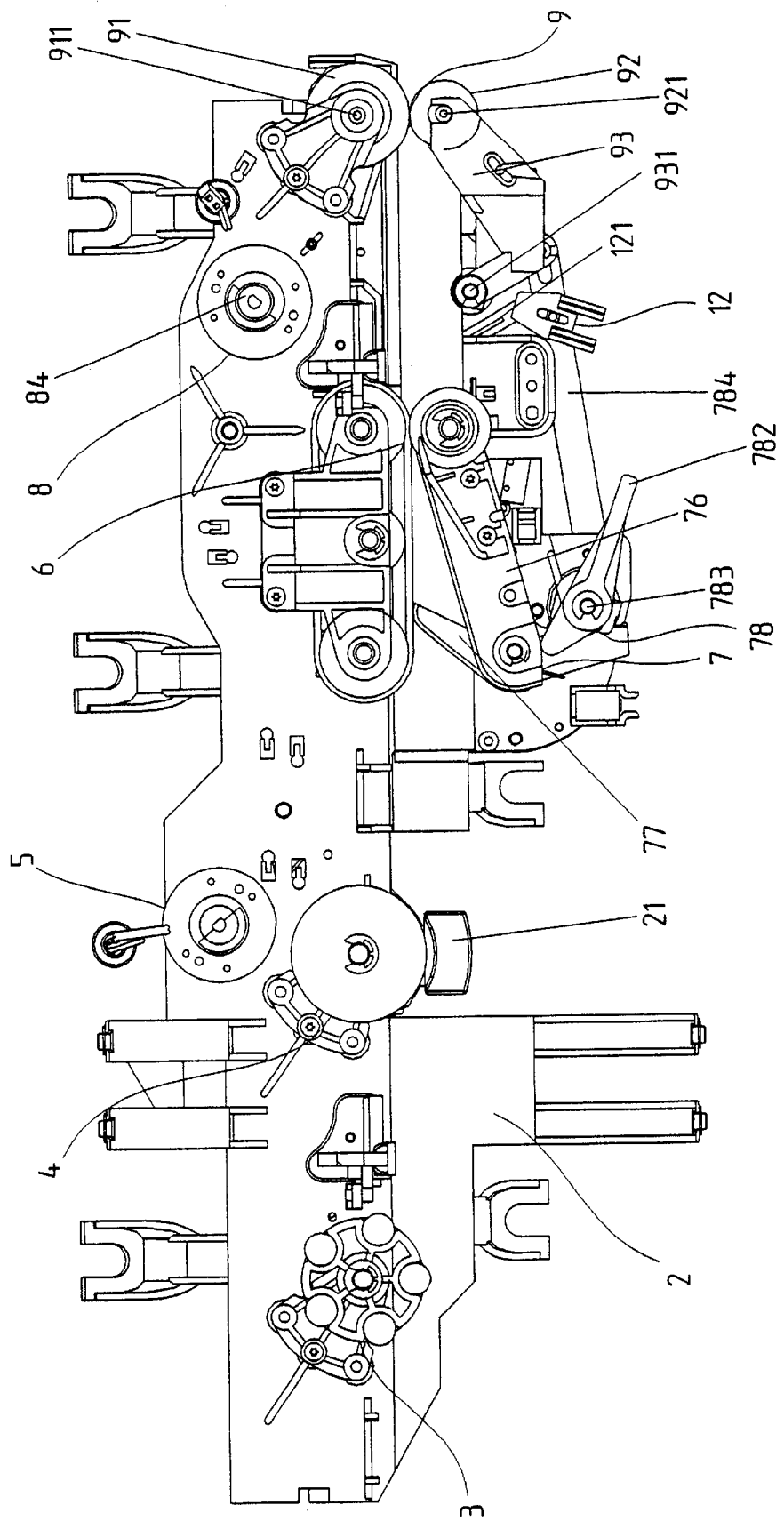
FIG. 3 is a partial plan view of the device illustrated in FIG. 2.
Figure 4:
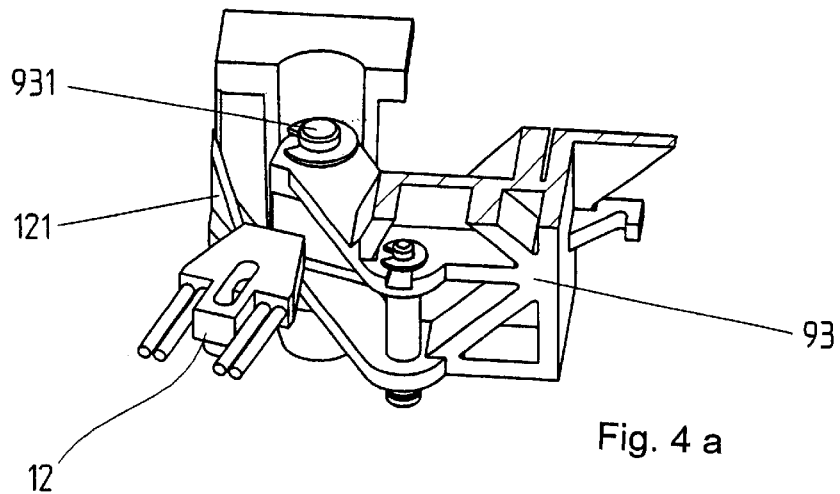
FIGS. 4a and 4b are perspective views respectively showing an assembled subassembly and an exploded subassembly with details relating to letter thickness measurement according to the invention.
Figure 4:
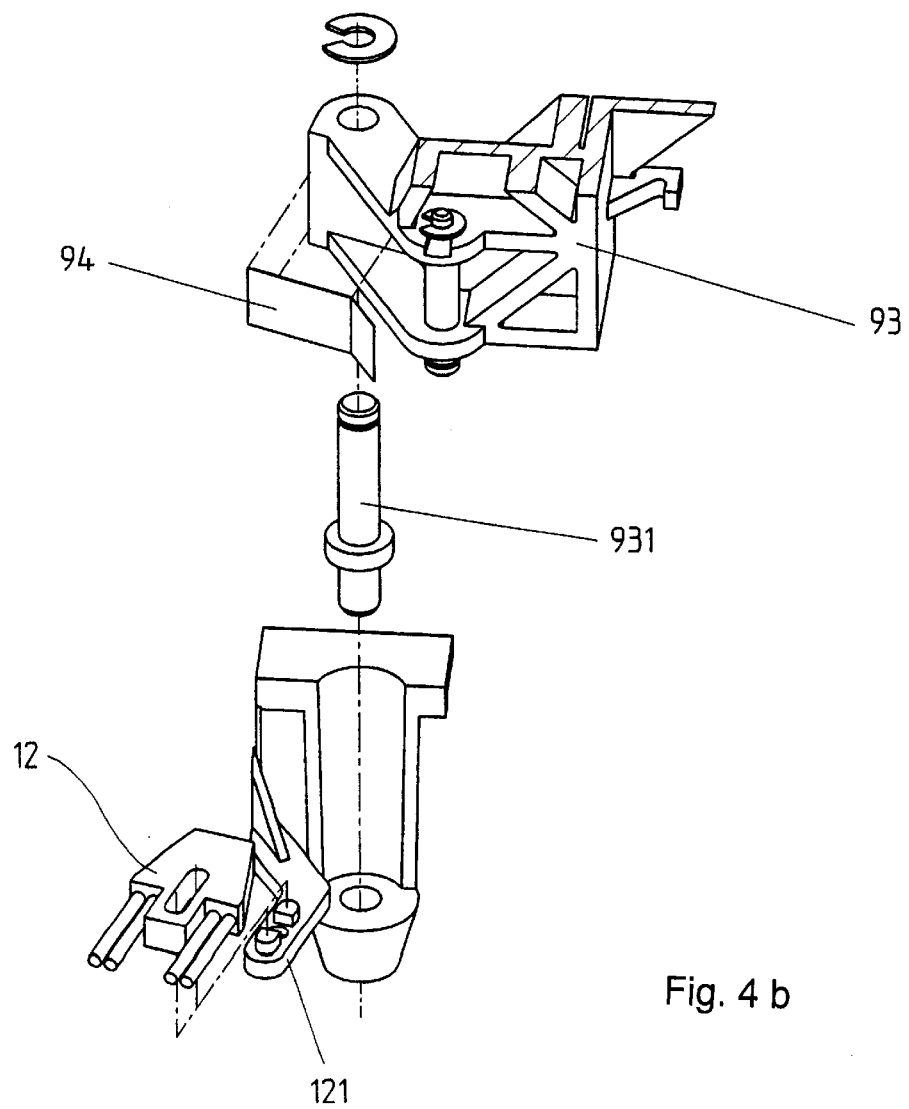
Figure 5A:
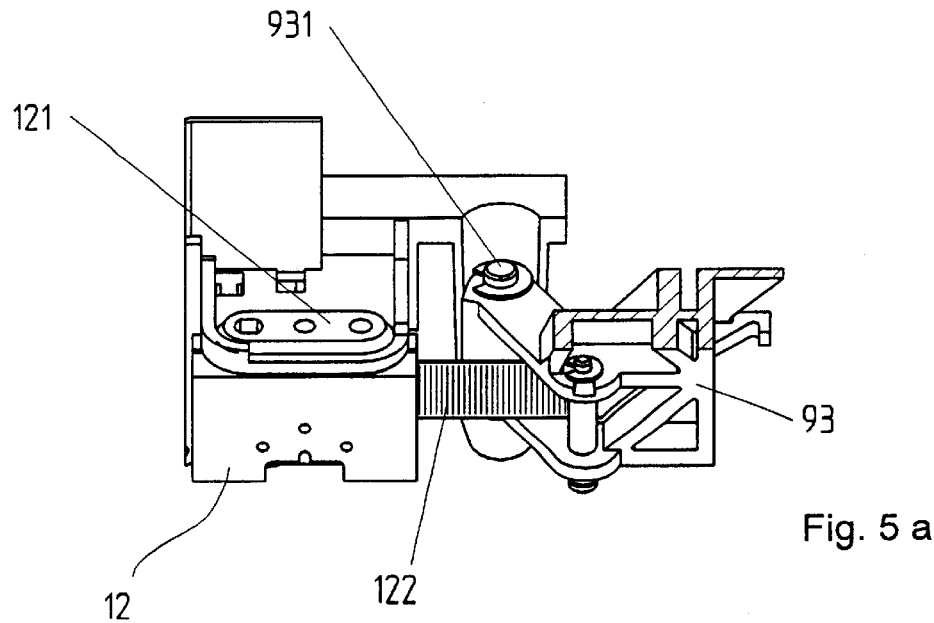
FIGS. 5a and 5b are perspective views respectively showing an assembled subassembly and an exploded subassembly with details relating to a further variant of the letter thickness measurement according to the invention.
Figure 5B:
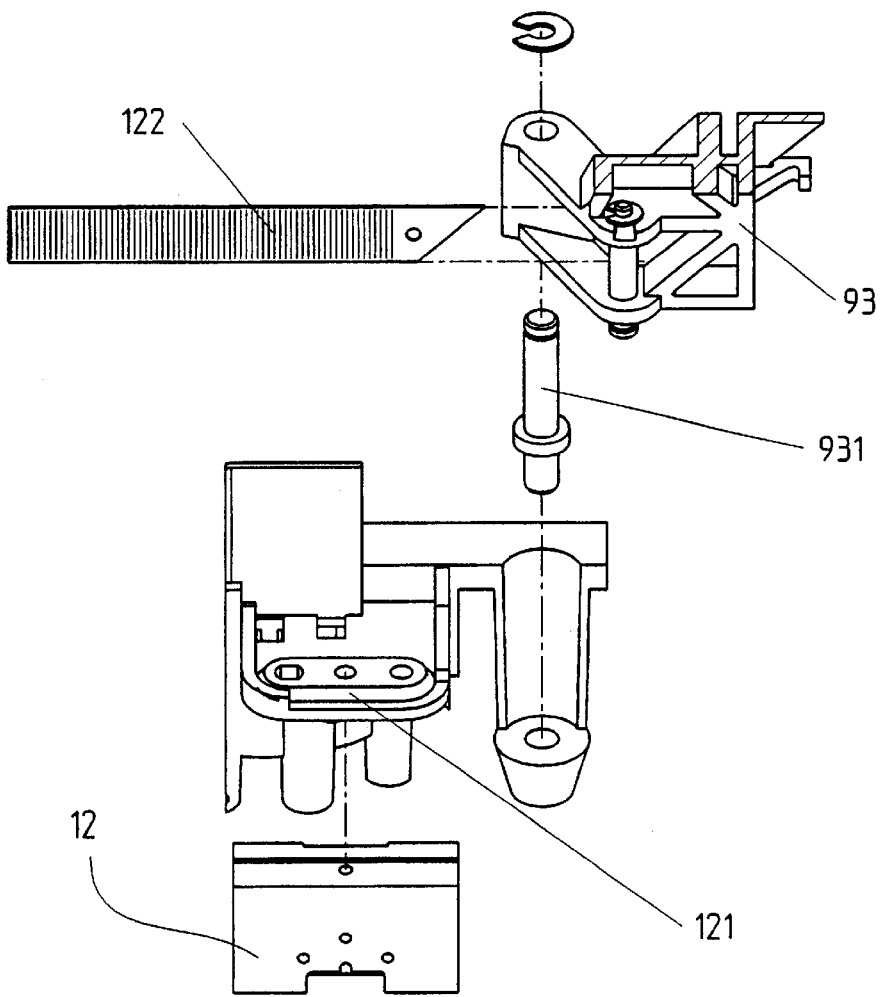
Figure 6:
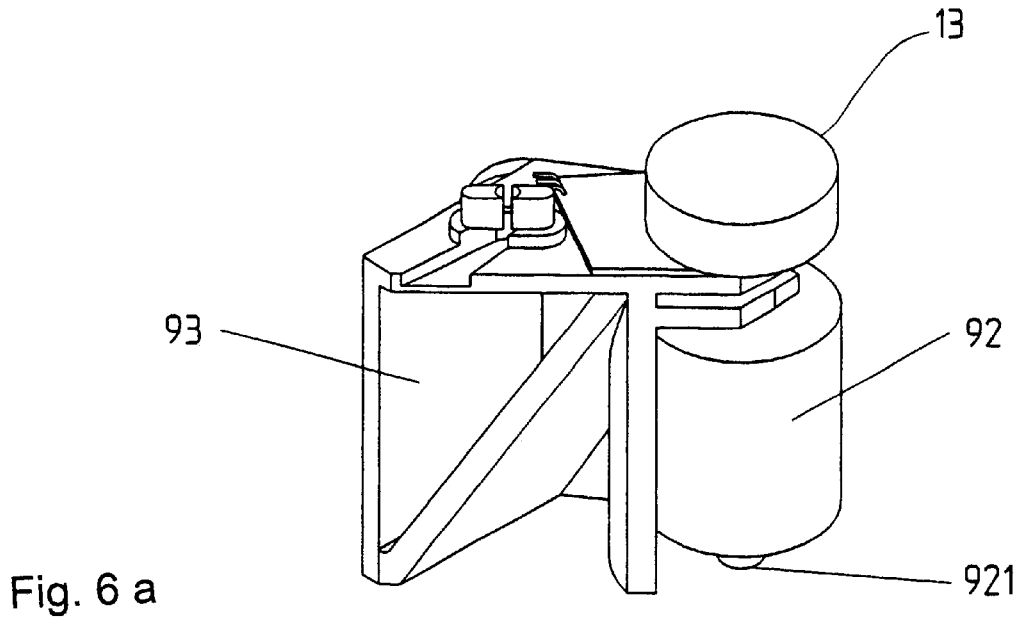
FIGS. 6a and 6b are perspective views respectively showing an assembled subassembly and an exploded subassembly with details relating to the letter length measurement according to the invention.
Figure 6:
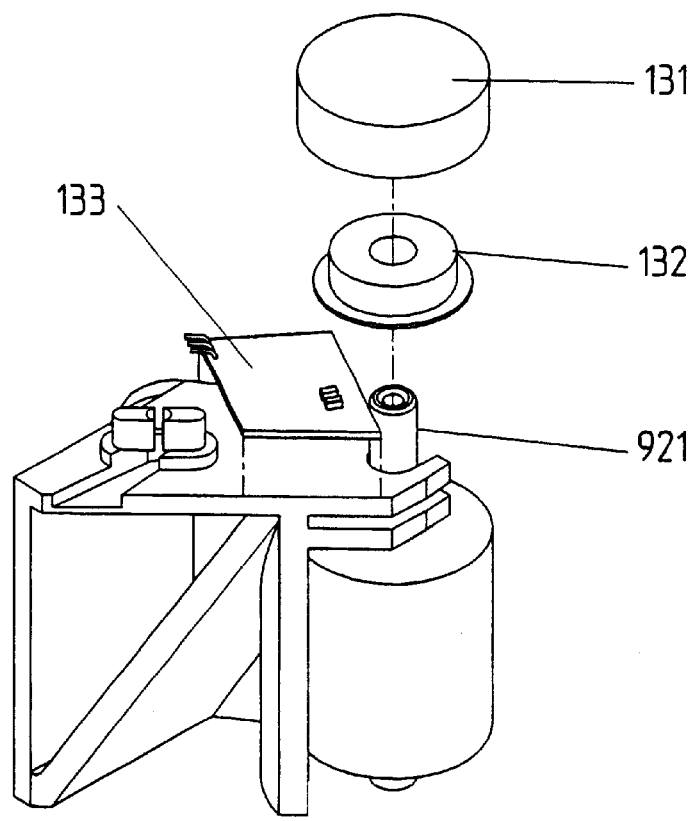

A second optical sensor 12, which is likewise constructed as a reflection sensor, for letter thickness measurement, is optically coupled to the carrying lever 93 for the indirectly driven ejection roll 92. The sensor 12 is fastened in a stationary manner on a supporting arm 121 which belongs to a device chassis, as is seen in FIGS. 3, 4a and 4b. The sensor 12 can also advantageously be constructed as a digital transmitted-light sensor having a flexible, graduated transparent rule 122 which is guided in the sensor and having one end that is fixed to the carrying lever 93, as is seen in FIGS. 5a and 5b. Furthermore, a sensor 13 constructed as an encoder is provided for letter length measurement. The encoder sensor 13 is coupled to the indirectly driven ejection roll 92 through a shaft 921 of the latter, as is seen in FIGS. 6a and 6b. Finally, a third optical sensor 14 constructed as a reflection sensor is also provided. The sensor 14 is disposed in the ejection area for the letter A, in the guide plate 1, directly downstream of the pair of ejection rolls 91, 92. This sensor 14 is used to detect whether a letter A has reached the ejection area or has left the latter. At the same time, the sensor 11 for determining the letter height, the sensor 12 for letter thickness measurement and the sensor 13 for letter length measurement are correspondingly activated or deactivated by the sensor 14. For this purpose, all of the sensors 11, 12, 13, 14 are electrically connected to an evaluation circuit 15, as is seen in FIG. 7.

According to FIG. 4b, a reflection marker 94 is fitted in the area of a shaft 931 of the carrying lever 93 for the indirectly driven ejection roll 92. The fixing of the reflection marker 94 is such that, when the carrying lever 93 rotates about its shaft 931, the reflection marker is largely also only rotated and not pivoted. The sensor 12, which is disposed on the supporting arm 121 so as to be stationary with respect to the shaft 931, is constructed as an analog reflection sensor. When the carrying lever 93 is deflected by a letter A passing through the pair of ejection rolls 91, 92, the reflection marker 94 is rotated in proportion to the thickness of the letter. The amount of light reflected to the sensor 12 decreases in a corresponding way as the letter thickness increases, and therefore so does the photocurrent output by the sensor 12.

The processing of the analog electrical signal into a corresponding digital signal is carried out in the connected evaluation circuit 15.

In the structure of the sensor 12 according to FIGS. 5*a* and 5*b*, when the carrying lever 93 is deflected by a letter A passing through the pair of ejection rolls 91, 92, the rule 122 is displaced, because of its flexibility, in proportion to the thickness of the letter. The photopulses generated by the moving graduation lines are a digital measure of the thickness of the letter. Measurement accuracies down to several hundredths of a millimeter are possible, depending on the fineness of the graduation.

According to FIGS. 6*a* and 6*b*, the sensor 13 for letter length measurement, or more precisely its cap 131 and an encoder disk 132, is fixed above the indirectly driven ejection roll 92, on the same shaft 921. An associated evaluation unit 133 with a photocell for encoder signals is fixed underneath the encoder disk 132 on the carrying lever 93 for the ejection roll 92. A letter A which passes through the pair 9 of ejection rolls is moved linearly past the driven ejection roll 91 by a frictional connection and likewise transmits its movement synchronously as a rotational movement by a frictional connection to the indirectly driven ejection roll 92. The rotational movement of the ejection roll 92 is transmitted to the shaft 921 and, from the latter, in turn to the encoder disk 132 and the cap 131. The optical signals from the encoder disk are converted by the photocell into a corresponding photocurrent and by the remaining part of the evaluation unit into electrical clock signals, and transmitted to the evaluation unit 15. In this case, one clock pulse corresponds to an associated unit length. Depending on the resolution power of the encoder disk 132, an accurate measurement is made which, in the case of the usual sensors, is on the order of magnitude of one millimeter.

Instead of the above-described structure of the sensor 13, it is also possible to use a structure in which the evaluation unit and the photocell are integrated into the cap, and the latter is then fastened to the carrying lever 93, and it is still only the encoder disk which rotates.

According to FIG. 7, the sensors 11, 12, 13 for determining the dimensions are linked to the sensor 14 for detecting the start and end of a letter, by the evaluation circuit 15 using an AND function. The signals from the sensors 11, 12, 13 are further processed in the evaluation circuit 15 depending on the output signal from the sensor 14, which in turn is determined by the letter A. Appropriately conditioned signals are transmitted by the evaluation circuit 15 to a following device 16. Depending on the processing mode, this can be an interconnected scale or balance and/or a franking machine.

We claim:

1. In a separating apparatus for printed media, including a guide plate on which the printed media rest in stacked form and along which the printed media are transported laterally, and a following device downstream of the guide plate, a configuration for determining dimensions of the printed media, comprising:
    a device for scanning the printed media and determining dimensions of the printed media; and
    an ejector for transferring the printed media from the guide plate to the following device, said ejector included in the scanning of at least one dimension of the printed medium.

2. In a separating apparatus for printed media, including a guide plate on which the printed media rest in stacked form and along which the printed media are transported laterally, and a following device downstream of the guide plate, a configuration for determining dimensions of the printed media, comprising:
    a device for scanning the printed media and determining dimensions of the printed media, including:
        at least one first optical sensor for determining height of the printed media, said at least one first optical sensor disposed in the guide plate, upstream of the pair of ejection rolls, at a distance smaller than a shortest printed medium length to be expected;
        an encoder sensor connected synchronously to said indirectly driven ejection roll and having a number of revolutions per printed medium used for printed-medium length measurement;
        a second optical sensor connected to said indirectly driven ejection roll for using a deflection of said ejection roll by the printed medium guided between said pair of ejection rolls for printed-medium thickness measurement;
        a third optical sensor disposed directly in the vicinity of said pair of ejection rolls, for detecting a start and an end of a printed medium in said ejection area and being linked electrically to said first optical, second optical and encoder sensors for activating said first optical, second optical and encoder sensors at the start of the printed medium and deactivating said first optical, second optical and encoder sensors at the end of the printed medium, to detect the dimensions of the printed medium; and
        an evaluation circuit disposed in the separating apparatus, electrically connected to said first optical, second optical, third optical and encoder sensors for transmitting measurement results and electrically connected to the following device; and
    an ejector for transferring the printed media from the guide plate to the following device, said ejector included in the scanning of at least one dimension of the printed medium, and said ejector being a pair of ejection rolls including a stationary driven ejection roll and a spring-adjustable indirectly driven ejection roll.

3. The configuration according to claim 2, wherein the following device is a scale.

4. The configuration according to claim 2, wherein the following device is a franking machine.

5. The configuration according to claim 2, wherein said at least one first optical sensor is many sensors disposed in a chain one above another, corresponding to usual formats, for determining the height of the printed media.

6. The configuration according to claim 2, wherein said at least one first optical sensor is a reflection sensor.

7. The configuration according to claim 2, including a rotatable shaft and a carrying lever for said indirectly driven ejection roll; said encoder sensor for printed-medium length measurement having an encoder disk and an evaluation unit with a photocell; said encoder disk and said indirectly driven ejection roll jointly fixed on said rotatable shaft; and said evaluation unit fixed underneath said encoder disk on said carrying lever.

8. The configuration according to claim 2, including a carrying lever having a shaft, said second optical sensor for printed-medium thickness measurement having an analog reflection sensor and a reflection marker fixed to said carrying lever opposite said stationary reflection sensor, in the vicinity of said shaft of said carrying lever.

9. The configuration according to claim 2, including a carrying lever having a shaft, said second optical sensor for printed-medium thickness measurement having a digital transmitted-light sensor and a flexible, graduated, transparent rule guided in said second optical sensor and fixed to said carrying lever in the vicinity of said shaft.

10. The configuration according to claim 2, wherein said ejection rolls define a line of contact therebetween, and said third optical sensor for detecting printed media is disposed immediately upstream of said line of contact.

11. The configuration according to claim 2, wherein said ejection rolls define a line of contact therebetween, and said third optical sensor for detecting printed media is disposed immediately downstream of said line of contact.

12. The configuration according to claim 2, wherein the printed media are envelopes.

13. The configuration according to claim 2, wherein the printed media are letters.

* * * * *